No. 839,480. PATENTED DEC. 25, 1906.
C. J. JAGER.
CLUTCH BAND FOR FRICTION CLUTCHES.
APPLICATION FILED FEB. 13, 1905.
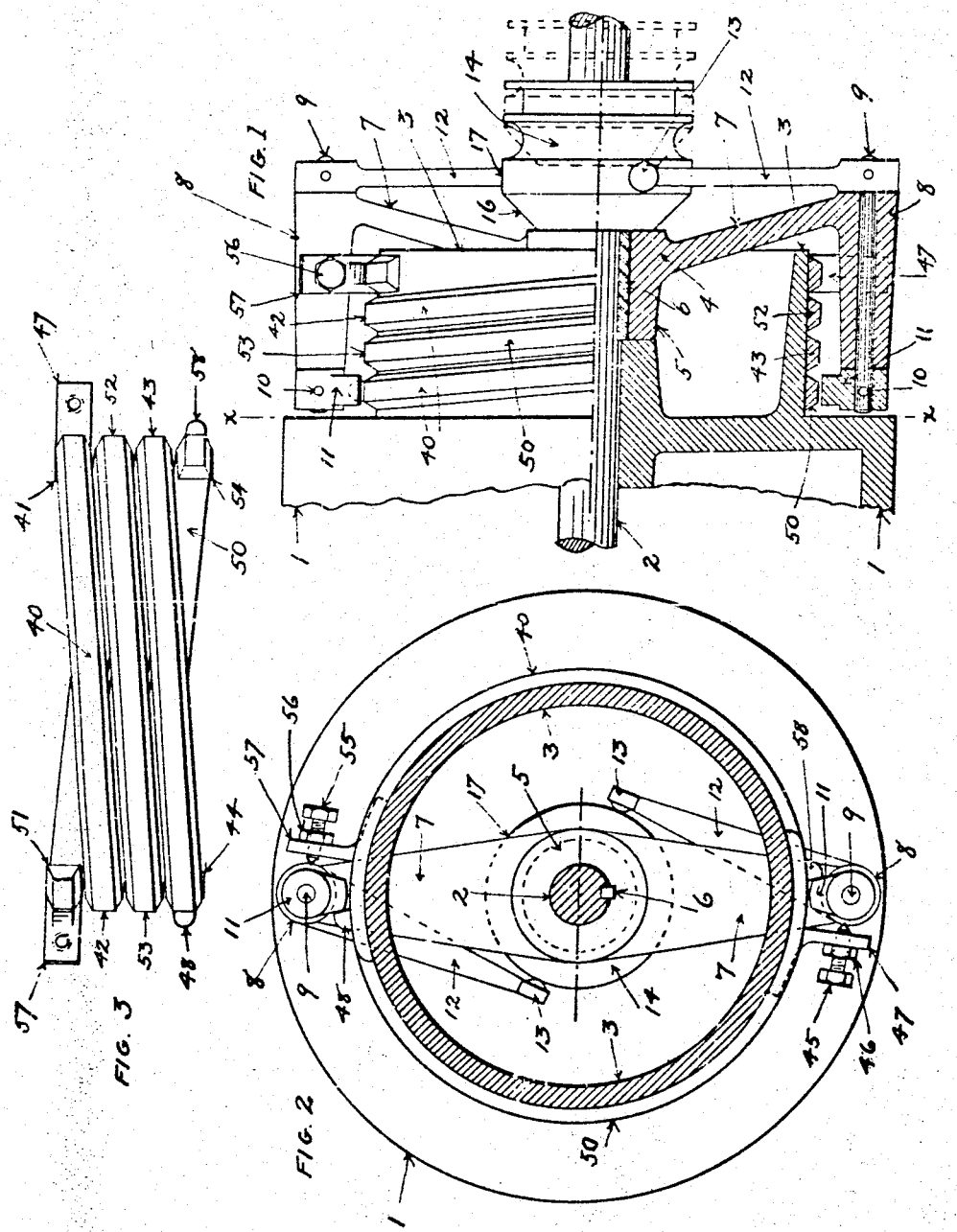
Witness
Oscar F. Hill
Alice Farr
Inventor
Charles J. Jager
by
Nathan B. Day
Attorney

UNITED STATES PATENT OFFICE.

CHARLES J. JAGER, OF BOSTON, MASSACHUSETTS.

CLUTCH-BAND FOR FRICTION-CLUTCHES.

No. 839,480.   Specification of Letters Patent.   Patented Dec. 25, 1906.

Application filed February 13, 1905. Serial No. 245,424.

*To all whom it may concern:*

Be it known that I, CHARLES J. JAGER, a citizen of the United States, residing at Boston, in the county of Suffolk, State of Massachusetts, have invented a certain new and useful Improvement in Clutch-Bands for Friction-Clutches, of which the following is a specification, reference being had therein to the accompanying drawings.

My invention relates to certain new and useful improvements in clutch-bands for friction-clutches used in power transmission, hoisting, or other machinery, in which the friction clutch-band is carried by one clutch member and is, by means of suitable mechanism, caused to bear forcibly against the surface of a drum fixed to the other clutch member, thereby causing frictional contact between clutch-band and drum which renders the clutch members irrevoluble with respect to each other.

It is well known that helical clutch-bands are well adapted for use in clutch members, by reason of the fact that when properly proportioned and arranged a slight initial application of tightening movement to the free end of the helical band causes the same to tighten throughout its entire length upon the drum-surface with great gripping force. This self-tightening feature is, however, objectionable, for the reason that the engagement of the clutch members is usually accompanied by a violent jerk or jump, which throws an undue strain upon the clutch mechanism, and is otherwise objectionable.

My invention has for its object the production of a clutch mechanism in which are embodied the self-tightening and other advantages of the helical clutch-band, with the elimination of the objectionable features usually accompanying the engagement of the clutch members, the said clutch being of an evenly-balanced construction to insure smooth running, simple in adjustment and manipulation, and reliable in operation.

In the accompanying drawings, Figure 1 shows a side view, partially in section, of a clutch embodying my invention, the clutch being shown in the position of engagement. Fig. 2 is a section of the same essentially on the plane *x x*, the hub portion of 1 being omitted. Fig. 3 shows the clutch-band detached from the rest of the clutch mechanism.

Referring to the drawings, 1 represents one of the clutch members, the same being shown as freely revoluble upon the main shaft 2. Preferably integral with 1 is a cylindrical drum 3, affording a bearing-surface for the clutch-band comprising the two component elements 40 50, as hereinafter set forth, encircling the same. The other clutch member 4 consists, as here shown, of a hub 5, fixed as to shaft 2 by means of the key 6 or other appropriate fastening device and provided with arms 7 7, radiating therefrom. The said arms 7 7 carry at their extremities bosses 8 8, having revolubly journaled therein, preferably parallel with shaft 2, the shafts or rockers 9 9, forming a part of the clutch-band-tightening mechanism.

Fixedly mounted upon one end of shafts 9 9 by means of pins 10 10 are the clutch-band-tightening dogs 11 11, bearing against the projections 48 58 on the free end of clutch-band 40 50. The other ends of shafts 9 9 carry, preferably pinned thereto, the lever-arms 12 12, extending from the said shafts 9 9 inwardly, but passing to one side of main shaft 2, and of such a length that the ends 13 13 of the lever-arms 12 12 bear against the surface of a sliding collar 14. Collar 14 is longitudinally movable upon main shaft 2 by means of any suitable mechanism (not shown in the drawings) and which may engage the collar by means of the groove 15, provided in one end of the same.

In Fig. 1 the collar 14 is shown in full lines in its operating position and in dotted lines in its position when the clutch members are not in engagement. The end of collar 14 which is adjacent the clutch member 5 consists of a tapering surface 16, terminating in a cylindrical portion 17. The dimensions of the tapered and cylindrical portions of collar 14 and the length and amount of inward inclination of the lever-arms 12 12 are such that when the clutch members are unengaged and the sliding collar 14 is moved upon main shaft 2 from its extreme position at the right of Fig. 1, as shown by dotted lines, leftward in the direction of clutch member 1 the smaller end of the tapering surface 16 first engages the ends 13 13 of the lever-arms 12 12 and with the continued movement of 14 forces them outwardly from main shaft 2. The said ends 13 13 finally rest upon the cylindrical portion 17 of collar 14 in the position of complete engagement of the clutch members, as shown in Fig. 1.

The clutch-band 40 50 is preferably made of bronze or of some tough and elastic material which combines a great tensile strength with wear-resisting qualities. As shown in the drawings, the said clutch-band consists of two similarly-formed components 40 and 50, each of which is a helix having slightly over one and one-half turns about drum 3. The coils of each helix are opened, so as to permit the coils of the companion helix to lie adjacent to or intermediate to its own coils, so that the helical bands lie alternately, with their respective edges preferably nearly contiguous upon the surface of drum 3. This arrangement may be seen more clearly by referring to Fig. 3 of the drawings, in which one helical component 40, starting at 41, completes approximately its first half-turn about the drum 3 at 42, the full turn at 43, and ends at 44, comprising slightly over one and one-half turns in all. In similar manner the companion helical band 50, commencing at 51, substantially diametrically opposite to 41, completes approximately the half-turn at 52, the full turn at 53, and the whole length, comprising slightly over one and one-half turns, is completed at 54.

The clutch-band comprising the two component helices combined as above pointed out is bored internally, so that in the normal condition (corresponding with a position when the clutch members are not engaged) it is freely revoluble upon the drum 3. Adjustable bearing-screws 45 and 55, provided with lock-nuts 46 and 56, mounted in the lugs 47 and 57, projecting, respectively, from the clutch-band components 40 and 50 near the ends 41 and 51 of the same, bear upon the exterior of the bosses 8 8 and prevent rotation of the clutch-band components with respect to clutch member 5. At or near the other or free ends of each of the said clutch-band components 40 and 50 are the projections 48 and 58, adapted to engage with the band-tightening dogs 11 11.

The operation of the clutch mechanism is as follows: When the clutch members are out of engagement, the collar 14 is in its extreme right-hand position, as shown by dotted lines in Fig. 1. To throw the clutch members into engagement, the collar 14 is moved toward the left in Fig. 1, causing the tapering surface 16 to bear against the ends 13 13 of the lever-arms 12 12. As the leftward movement of collar 14 continues the increasing diameter of the tapering surface 16 forces the ends 13 13 of the lever-arms 12 12 outwardly from shaft 2, causing a right-handed rotation of the shafts 9 9, journaled in the bosses 8 8, and a consequent right-handed rotation of the band-tightening dogs 11 11. A continued leftward movement of collar 16 will cause further rotation of dogs 11 11 and a consequent circumferential movement of the free ends of the clutch-band components, and since the screws 45 and 55, bearing upon the bosses 8 8, prevent further rotation of the clutch-band components upon the drum 3 the circumferential movement of the free ends of the clutch-band helical components will effect such a diminution in the internal diameter of the coils as to cause them to grip the drum 3. Finally, when collar 16 has reached the limit of its leftward movement, occupying the position shown in Fig. 1, the ends 13 13 of the lever-arms 12 12 rest upon the cylindrical surface 17 of collar 14, in which position the outward movements of arms 12 12 have been sufficient to rotate dogs 11 11 and to cause a circumferential movement of the free ends of the clutch-band components to such a degree that the clutch-band will grip the drum 3 with enough force to transmit the power desired.

On desiring to throw the clutch members out of engagement the collar 14 is moved toward the right from the position shown in Fig. 1, whereupon the elasticity of the clutch-band components causes them to resume their normal condition, releasing the drum 3 from their grip and restoring dogs 11 11 and lever-arms 12 12 to their normal initial positions.

To insure the most satisfactory results, it has been found desirable to adjust the bearing-screws 45 and 55 so as to cause one clutch-band component to grip the drum 3 slightly before its companion component. The effect of this will be that the clutch-band component which first engages the drum will tighten in the manner characteristic to helical bands throughout its entire length upon the drum-surface, but not having sufficient gripping-surface to transmit the full power of the clutch will slip on the drum until further movement of the tightening mechanism causes the companion clutch-band to take hold, when the combined gripping effect of both components will transmit the full power of the clutch without slip. When, however, a clutch-band comprising a single helix which has a gripping-surface and consequent driving power equivalent to that of the double helical band is used, the initial application of tightening force to the free end of the band will cause its coils to take hold along their entire length, bringing its total gripping power into effect at once. This sudden application of full gripping power will not allow the clutch members to slip while engaging, with the result that they engage with a violent jerk, which is objectionable for obvious reasons.

In my clutch, for the reasons above pointed out, any tendency to jump or jerk, due to the sudden engagement of the clutch members, is minimized.

While I have hereinabove described my invention as applied in a clutch-band having two component members, three or more component members may be used, in which case they should preferably be provided with individual adjusting and tightening devices operating in the manner above set forth, and clutch member 5 should be formed with a corresponding number of arms. Moreover, the number of coils in each helical component may be increased if necessitated by the power requirements in any special case.

It is also evident that my invention may be applied to friction-clutches wherein the clutch-band embodying substantially the features hereinabove set forth is caused to expand against the adjacent internal surface of a drum, in which case the necessary mechanical modifications of the tightening and adjusting mechanisms above described may be readily made by any mechanic conversant with the art. Furthermore, for the cylindrical "friction-drum," so called, may be substituted a drum having a conical or tapering surface, the clutch-band in this case being formed with a corresponding taper and being adapted to engage either externally or internally with the tapering surface of the drum.

Having described my invention, what I claim as my invention, and desire to secure by Letters Patent, is—

1. In a friction-clutch, in combination, the driven member having the barrel or drum portion, the driving member having a plurality of rockers journaled therein, operating means for said rockers, a plurality of clutch-bands encircling the said barrel or drum portion, respectively furnished at one end with lugs that are acted against by dogs fast on the respective rockers, and at the other end provided with adjustable contact-screws 45, 55, abutting on said driving member.

2. In a friction-clutch, in combination, the driven member having the barrel or drum portion, the driving member having a plurality of rockers journaled therein, operating means for said rockers, and a plurality of clutch-bands encircling the said barrel or drum portion in alternating or interlying helical coils, each band extending more than once around the said drum or barrel and the said bands being in operative connection with the said rockers.

3. In a friction-clutch, in combination, a clutch member having a drum or barrel, a second clutch member having radial arms provided with the bosses 8, 8, the shafts 9, 9, journaled in the said bosses and provided at one end with the dogs 11, 11, and at the other end with the lever-arms 12, 12, the sliding collar 14 by which the lever-arms are actuated, and a plurality of clutch-bands helically wound upon the said drum or barrel in interlying coils, the said bands being provided at one end with the adjusting-screws 45, 55, which bear against the bosses 8, 8, and at the other end with the projections 48, 58, which are engaged by the dogs 11, 11.

In testimony whereof I affix my signature in presence of two witnesses.

CHARLES J. JAGER.

Witnesses:
  NATHAN B. DAY,
  WILLIAM A. COPELAND.